United States Patent [19]

Vienneau et al.

[11] Patent Number: 5,752,545
[45] Date of Patent: May 19, 1998

[54] FLOW CONTROL DEVICE AND FLOWMETER FOR GRANULAR MATERIAL OR THE LIKE

[75] Inventors: Leonard A. Vienneau, Burlington; Anthony K. Vienneau, Mississauga; Gary R. Baksi, North York, all of Canada

[73] Assignee: Comptrol Computer Control, Inc., Canada

[21] Appl. No.: 641,220

[22] Filed: Apr. 30, 1996

Related U.S. Application Data

[60] Provisional application No. 60/009,187 Dec. 22, 1995.

[51] Int. Cl.$^6$ ................................................ F16K 1/12
[52] U.S. Cl. .................. 137/486; 137/487.5; 73/861.73; 251/205
[58] Field of Search ............... 73/861.72, 861.73; 251/205, 120, 298, 326; 137/486, 487.5

[56] References Cited

U.S. PATENT DOCUMENTS

| 3,640,135 | 2/1972 | Tomiyasu et al. . | |
|---|---|---|---|
| 4,069,709 | 1/1978 | Volk et al. . | |
| 4,354,622 | 10/1982 | Wood | 73/861.73 |
| 4,440,029 | 4/1984 | Tomiyasu et al. . | |
| 4,481,831 | 11/1984 | Margison | 73/861.73 |
| 4,531,539 | 7/1985 | Jandrasi | 251/326 |
| 4,538,471 | 9/1985 | Volk, Jr. et al. . | |
| 4,543,835 | 10/1985 | Volk, Jr. et al. . | |
| 4,677,859 | 7/1987 | Chinery | 73/861.72 |
| 4,687,020 | 8/1987 | Doyle | 137/486 |
| 4,718,284 | 1/1988 | Pfeiffer . | |
| 4,768,387 | 9/1988 | Kemp et al. . | |
| 5,335,554 | 8/1994 | Kempf et al. . | |
| 5,402,603 | 4/1995 | Henley | 251/298 |

FOREIGN PATENT DOCUMENTS

| 2 587 482 | 3/1987 | France . |
|---|---|---|
| 2947414C2 | 5/1981 | Germany . |

*Primary Examiner*—Denise L. Ferensic
*Assistant Examiner*—Ramyar Farid
*Attorney, Agent, or Firm*—Leydig, Voit & Mayer, Ltd.

[57] ABSTRACT

A flow control device to control the rate of flow of granular material or the like therethrough has a valved inlet to control the ingress of material into the flow control device. A flowmeter is downstream of the valved inlet to receive the material and detect the rate of flow thereof. The material travels along a generally steep path between the valved inlet and the flowmeter. The flowmeter includes a guide to collect the material into a generally coherent stream and redirect the stream from the generally steep path to a generally horizontal path. A controller is responsive to the flowmeter and controls the valved inlet so that the rate of flow of material through the flow control device is at or near to a desired rate.

15 Claims, 7 Drawing Sheets

FLOW CONTROL DEVICE AND FLOWMETER FOR GRANULAR MATERIAL OR THE LIKE

The present application is a continuation of provisional application Ser. No. 60/009,187, filed Dec. 22, 1995.

FIELD OF THE INVENTION

The present invention relates to a flow control device for granular material or the like to measure the flow rate of material through the device and for adjusting the ingress of material to maintain the flow rate of material at a desired rate. The present invention also relates to a flowmeter for granular material or the like to detect the flow rate of the material.

BACKGROUND OF THE INVENTION

Flow control devices to detect the rate of flow of granular material or the like are well known in the art. Measurements made by devices of this nature typically provide input to a feedback control loop to control the input of material to the flow control device so that the rate of flow of material through the flow control device remains at or near to a desired rate.

For example, U.S. Pat. No. 3,640,135 to Tomlyasu et al. discloses a device for measuring flow rates of granular material or the like. The device has an inlet which receives the flow of material and allows it to drop onto a detecting plate. The horizontal component of the impact force imparted on the detecting plate by the falling material is used to generate an output signal proportional to the rate of flow of the material.

U.S. Pat. No. 4,069,709 to Volk et al discloses a flow rate sensor for measuring flow rates of granular material or the like. The flow rate sensor includes an inclined deflection plate disposed within a chute receiving the flow of material. The deflection plate is mounted on an arm which itself is attached to a pivotal member. When material impacts the deflection plate, the deflection plate resolves the impact force into vertical and horizontal components. Since the pivotal member is only permitted to pivot about a vertical axis, the vertical force component is cancelled and the horizontal component produces a pivotal deflection of the arm and the pivotal member. This deflection is measured by a transducer and used to generate an output signal proportional to the rate of flow of the material.

U.S. Pat. No. 4,440,029 to Tomlyasu et al. discloses an impact flowmeter for granular material having a sensing plate which is suspended within a chute. An inclined flow guide is positioned within the chute for directing granular material towards the sensing plate. An impact force detector behind the sensing plate measures the horizontal component of the impact force imparted on the sensing plate by the material.

U.S. Pat. Nos. 4,538,471 and 4,543,835 to Volk Jr. et al. disclose a dry flow sensor incorporating a linear force transducer. The sensor includes an inclined plate disposed within a chute and supported by a number of leaf springs. An actuator rod extends from the inclined plate to a servomechanism. The servo-mechanism generates a force to resist movement of the plate as granular material impacts upon it. The force applied to the plate by the servo-mechanism is used to measure the rate of flow of the granular material.

U.S. Pat. No. 4,768,387 to Kemp et al. discloses a flowmeter for granular material having an inclined inlet tube receiving material. A part cylindrical impact plate is suspended within the flowmeter and is positioned so that material impacts the plate as it enters the inlet tube. The horizontal component of the force imparted on the impact plate by the material is measured by strain gauges affixed to the impact plate to measure the rate of flow of the granular material through the flowmeter.

U.S. Pat. No. 5,335,554 to Kempf et al. discloses an impact flowmeter having a housing accommodating an impact plate mounted on a load cell. The impact plate is positioned within the housing so that material entering the housing impacts the plate causing the plate to deflect the load cell. Deflection of the load cell causes a change in its output signal which is used to measure the rate of flow of the granular material through the flowmeter.

Although the above patents disclose devices for detecting the rate of flow of granular material, problems with devices of this nature exist. In particular, in most of the devices disclosed in the above-identified patents, an inclined deflection plate is positioned in the path of free-falling material. Since the material is free-falling, the angle of deflection of the material is uncertain due to the fact that the collision between the material and the deflection plate is more or less elastic depending on the properties of the material. This results in the material being dispersed in many directions after impacting the deflection plate and uneven forces being applied to the deflection plate even though the flow rate of the material may be basically constant. This may of course yield inaccurate measurements of the rate of flow of material through the devices.

Accordingly, improved devices to detect more accurately the rate of flow of material to allow the flow rate to be better controlled are continually being sought. It is therefore an object of the present invention to provide a novel flow control device to maintain the rate of flow of granular material or the like at or near to a desired rate and to a novel flowmeter for granular material or the like.

SUMMARY OF THE INVENTION

According to one aspect of the present invention there is provided a flow control device to control the rate of flow of granular material or the like therethrough comprising:

a valved inlet to control the ingress of material into said flow control device;

a flowmeter downstream of said valved inlet to receive said material and detect the rate of flow thereof, said material travelling along a generally steep path between said valved inlet and said flowmeter, said flowmeter including a guide to collect said material into a generally coherent stream and redirect said stream from said generally steep path to a generally horizontal path; and a controller responsive to said flowmeter and controlling said valved inlet so that the rate of flow of material through said flow control device is at or near to a desired rate.

Preferably, the guide is in the form of a curved deflection chute having one end adjacent the valved inlet and an opposite end adjacent an outlet with the deflection chute redirecting the stream to a path slightly below horizontal.

It is also preferred that the flowmeter further includes suspension means supporting the deflection chute to allow the deflection chute to displace as a result of forces applied thereto as the stream is redirected and sensing means to detect displacement of the deflection chute and to generate output signals proportional to the rate of flow of material. In one embodiment, the suspension means includes an arm supporting the deflection chute and a parallelogram suspension to which the arm is attached. Displacement of the deflection chute is translated to the parallelogram suspension, and displacement of the parallelogram suspension is detected by the sensing means. Preferably, the sensing means includes a displacement transducer to detect displacement of the parallelogram suspension.

It is also preferred that the valved inlet includes a chute having an opening to receive the ingress of the material and a gate moveable in response to the controller to adjust the cross-sectional area of the opening and thereby control the ingress of material. The opening is configured to compensate for non-linearities to maintain generally a linear increase in the ingress of material as the cross-sectional area of the opening is increased. In one embodiment, the opening is trapezoidal and therefore tapers inwardly as the gate increases the cross-sectional area thereof.

According to another aspect of the present invention there is provided a flowmeter to detect the rate of flow of granular material or the like comprising:

- a guide to collect material travelling along a generally steep path into a generally coherent stream and to redirect said stream from said generally steep path to a generally horizontal path;
- suspension means supporting said guide to allow said guide to displace as a result of forces applied thereto as said stream is redirected; and
- sensing means to detect displacement of said guide and to generate output signals proportional to said rate of flow of material.

According to still yet another aspect of the present invention there is provided a flow control device to control the rate of flow of granular material or the like therethrough comprising:

- a valved inlet to control the ingress of material into said flow control device;
- a flowmeter downstream of said valved inlet to receive said material and detect the rate of flow thereof;
- a guide to collect material travelling between said valved inlet and said flowmeter into a coherent stream before said material reaches said flowmeter; and
- a controller responsive to said flowmeter and controlling said valved inlet so that the rate of flow of material is at or near to a desired rate.

The present invention provides advantages in that the accuracy of the control of the rate of flow of the material through the flow measurement device is increased as compared to prior art designs. This allows more accurate flow control to be achieved. The increased accuracy of the measurement of the rate of flow of material by the present invention is achieved primarily for two reasons. Firstly, by collecting the material into a coherent stream as it travels through the flowmeter, a more consistent force is imparted on the flowmeter by the material. Secondly, by redirecting the coherent stream as it travels through the flowmeter, an increased force is imparted on the flowmeter increasing its sensitivity.

BRIEF DESCRIPTION OF THE DRAWINGS

An embodiment of the present invention will now be described more fully with reference to the accompanying drawings in which:

FIG. 1 is a transparent perspective view of a flow control device for granular material or the like;

DESCRIPTION OF THE PREFERRED EMBODIMENTS

Figure 7:
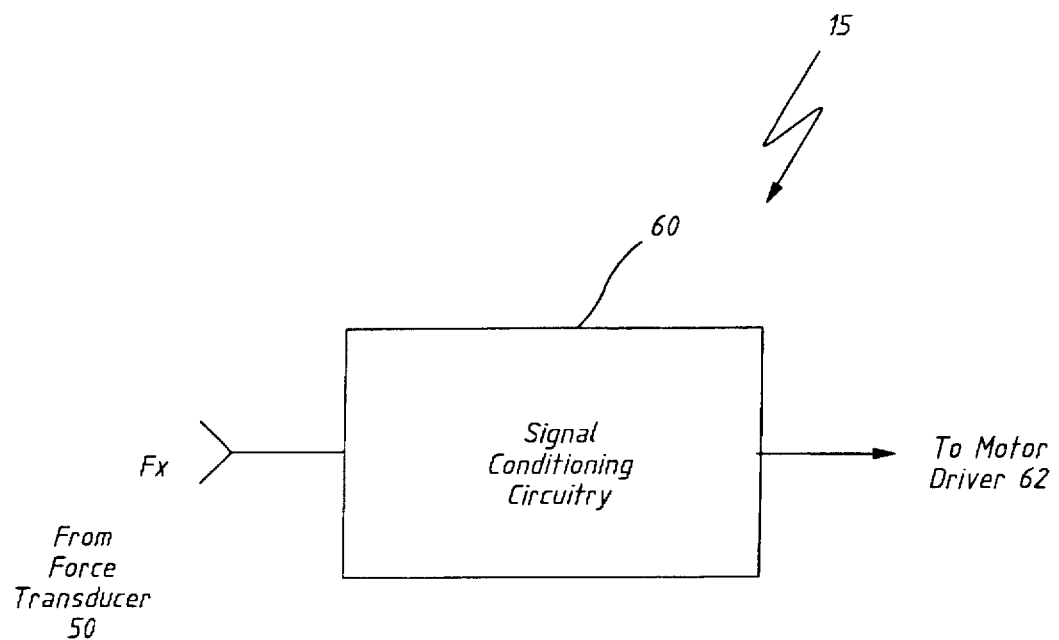
FIG. 7 is a schematic of a feedback control loop forming part of the flow control device of FIG. 1.

Referring now to the Figures, a flow control device for controlling the rate of flow of granular material or the like therethrough is shown and is generally indicated to by reference numeral 8. The flow control device 8 includes a housing 10 partitioned into a pair of compartments 10a and 10b by an internal wall 10c. Accommodated by the compartments of the housing are a valved inlet 12 to receive the ingress of material, a flowmeter 14 to detect the rate of flow of material through the flow control device 8, a controller 15 responsive to the flowmeter (see FIG. 7) and providing feedback to the valved inlet 12 and an outlet 16 to permit the egress of material.

Figure 1:
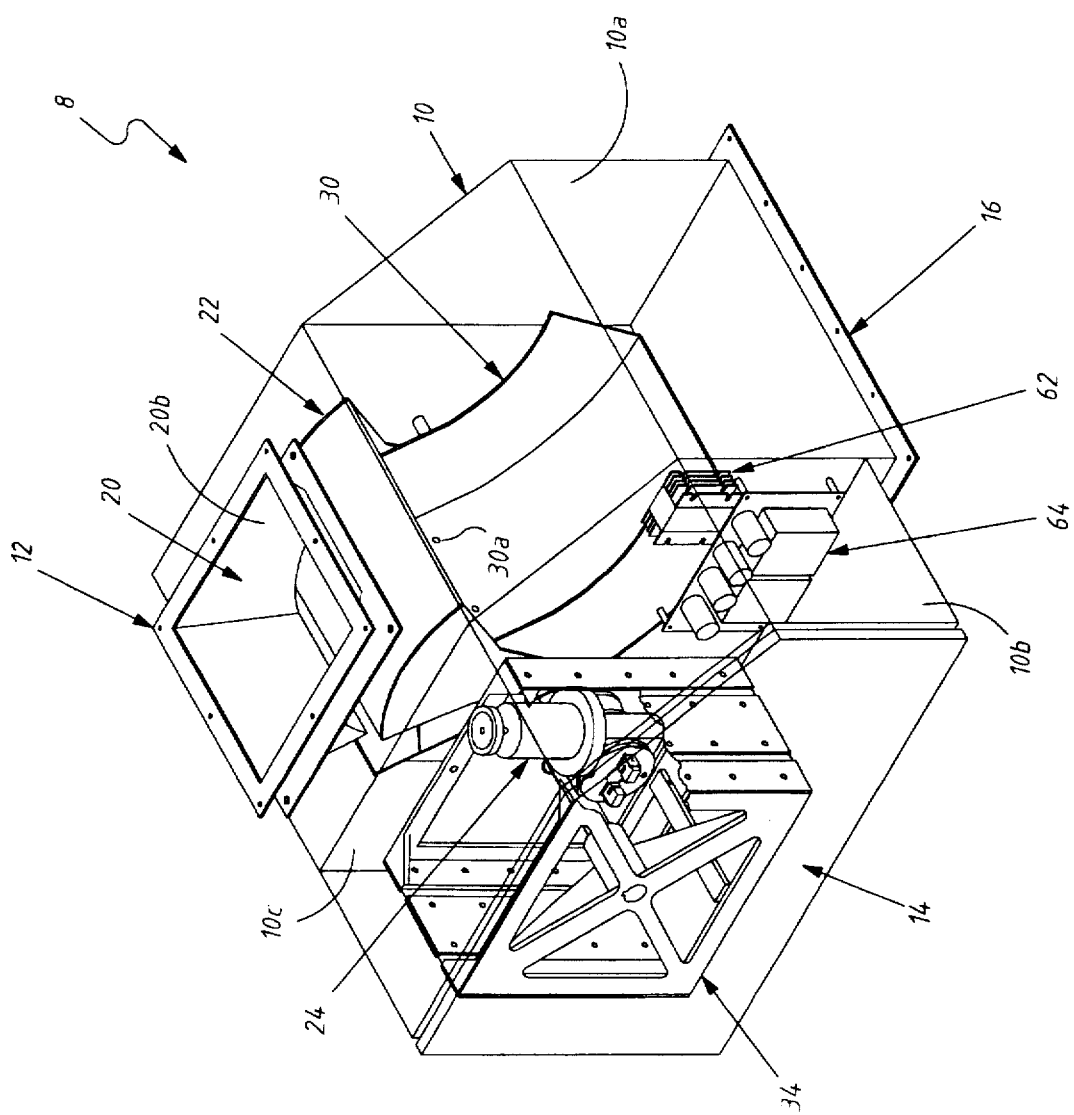
Figure 2:
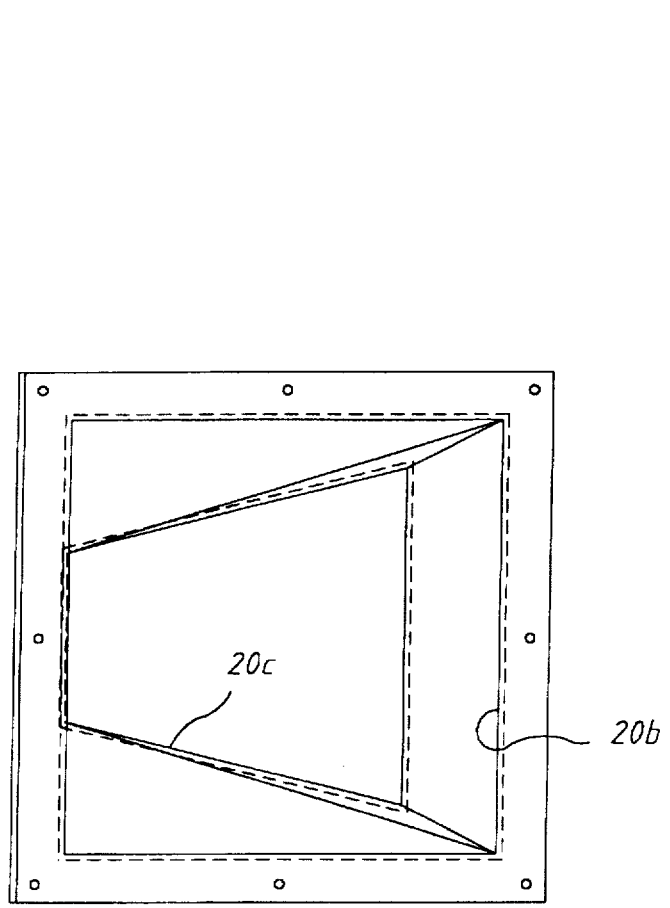
FIG. 2 is a top plan view of an inlet chute forming part of the flow control device of FIG. 1.
Figure 3:
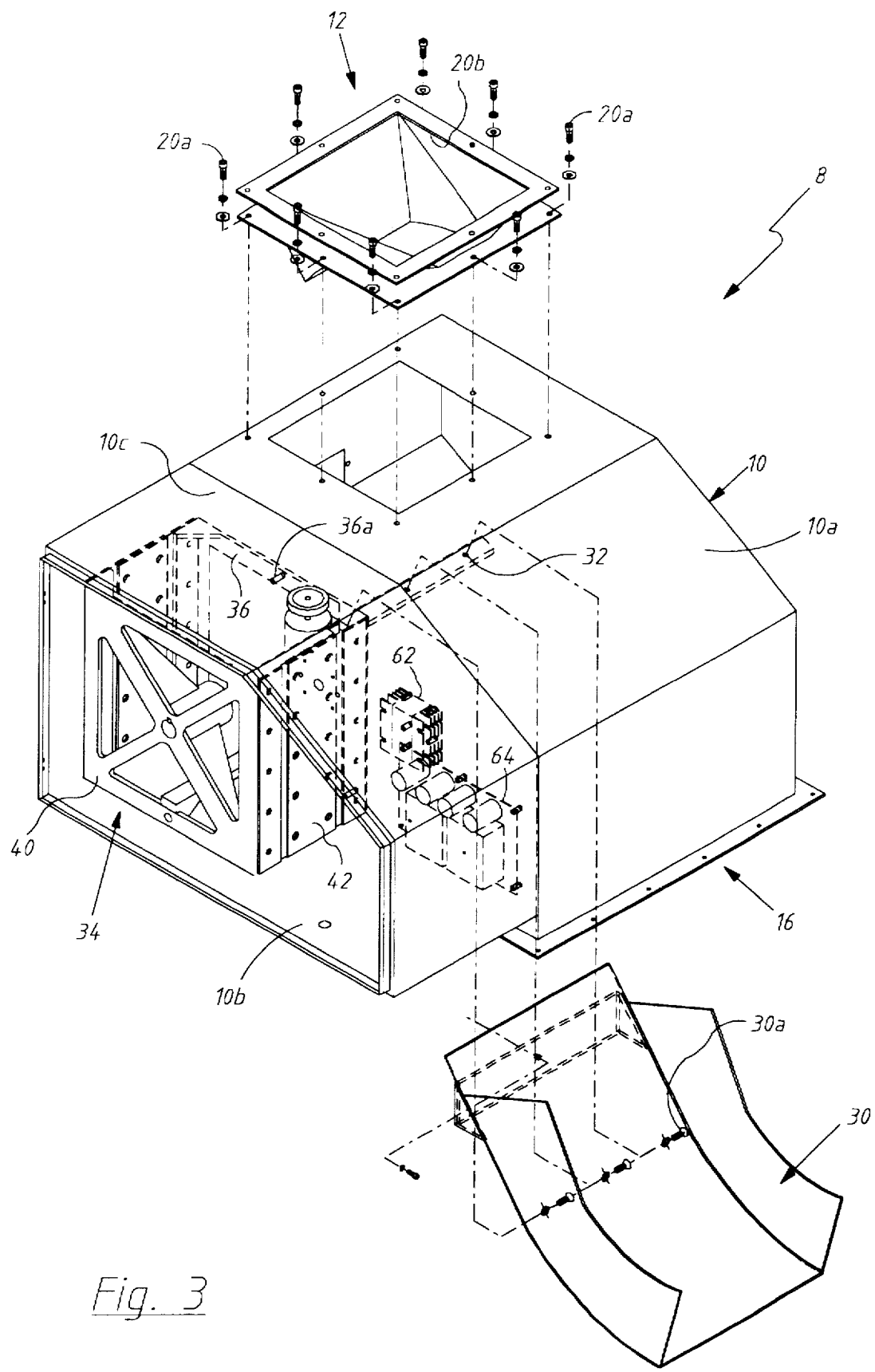
FIG. 3 is a partially exploded, transparent perspective view of the flow control device of FIG. 1.
Figure 4:
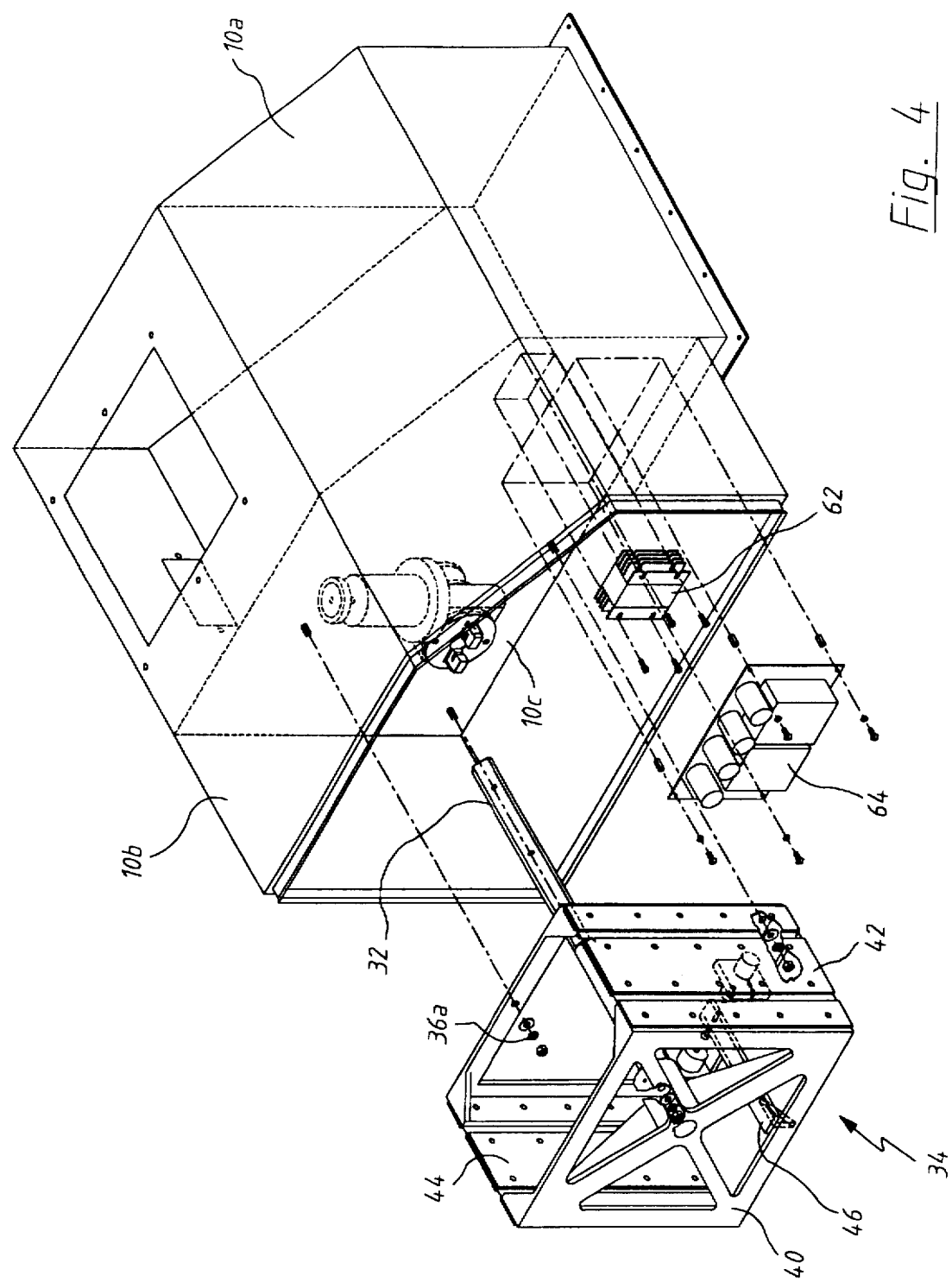
FIG. 4 is a partially exploded, perspective view of a portion of the flow control device of FIG. 1 illustrating a parallelogram suspension.

The valved inlet 12 is constituted by a chute 20 secured to the top of the compartment 10a by way of fasteners 20a. The chute 20 receives the flow of material via a generally square inlet 20b and directs the material to the flowmeter 14 by way of a generally trapezoidal outlet 20c (best seen in FIGS. 2 and 3). An inlet gate 22 is located beneath the outlet 20c and is responsive to a gate control motor 24. The gate control motor 24 is responsive to the controller 15 and controls the position of the inlet gate 22 with respect to the outlet 20c to control the ingress of material to the flowmeter 14.

Figure 5:
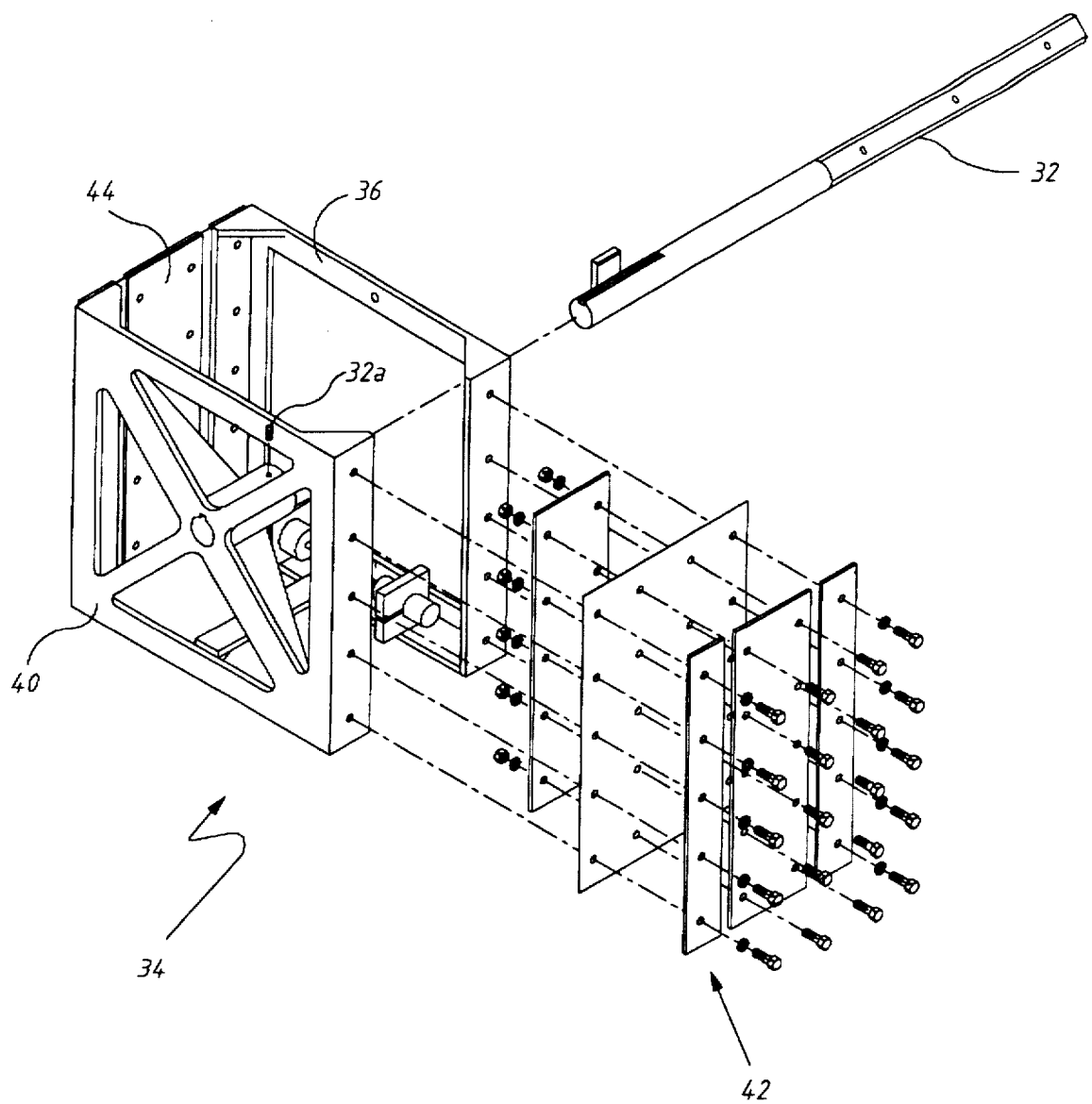
FIG. 5 is a partially exploded, perspective view of the parallelogram suspension of FIG. 4.

The flowmeter 14 includes a guide in the form of a curved, deflection chute 30 having a generally U-shaped cross-section. The deflection chute has one end adjacent the outlet 20c and an opposite end adjacent outlet 16. The deflection chute 30 collects the flow of material through the flowmeter 14 into a coherent stream and redirects the stream of material from a generally vertical path to a generally but slightly below horizontal path. The deflection chute 30 is mounted on an arm 32 by way of fasteners 30a (see FIG. 3). The arm 32 extends to a leaf spring parallelogram suspension 34, the plane of which is horizontal. The arm 32 is keyed to the parallelogram suspension 34 and retained by fastener 32a (see FIG. 5).

Figure 6:
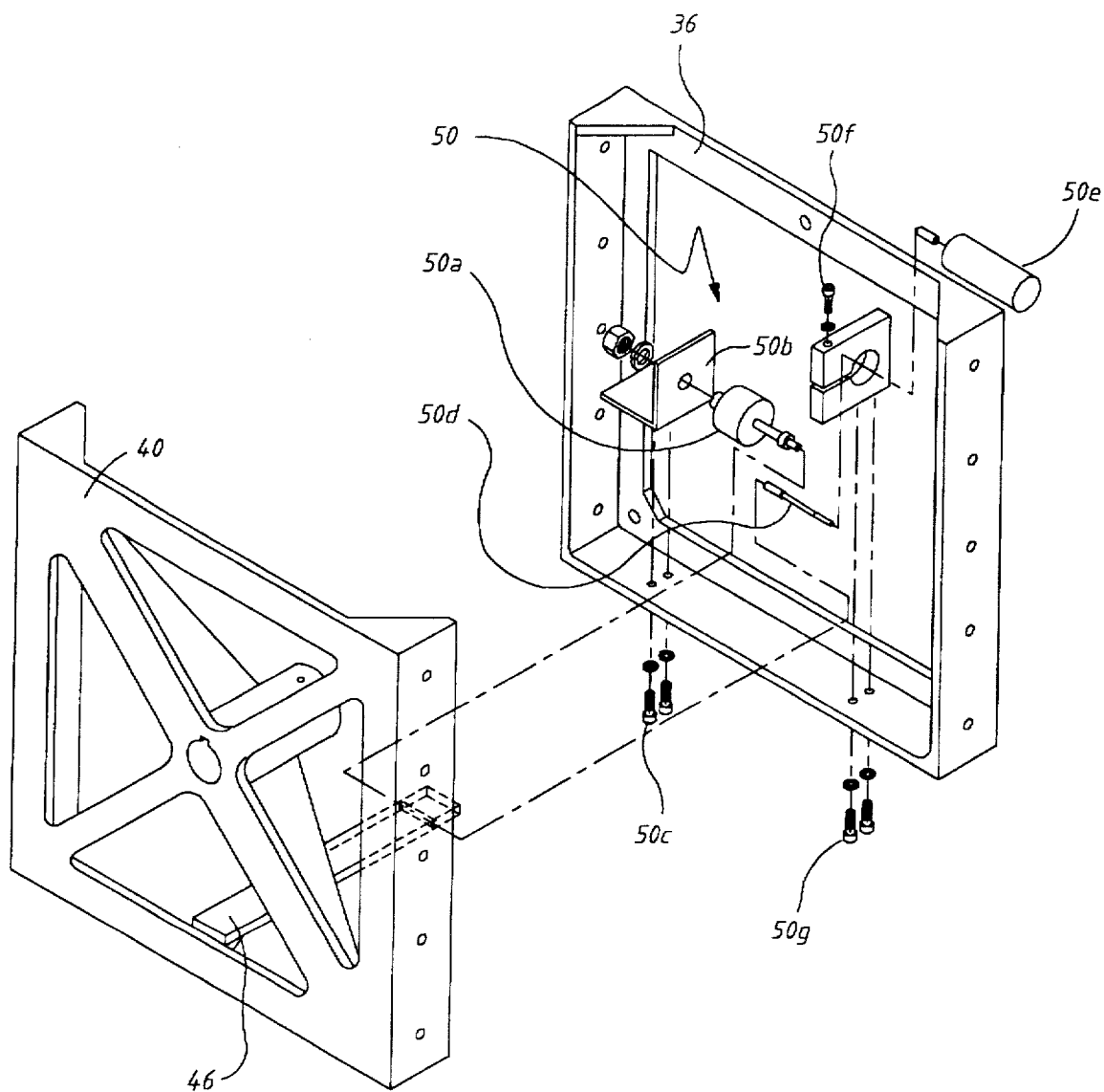
FIG. 6 is an exploded, perspective view of a portion of the parallelogram suspension of FIG. 4 illustrating a displacement transducer.

The parallelogram suspension 34 includes a stationary frame member 36 mounted on internal wall 10c of the housing 10 by fasteners 36a. A second frame member 40 is coupled to the frame member 36 by way of leaf springs 42 and 44 respectively. The arm 32 is keyed to frame member 40 allowing the deflection chute 30, arm 32 and frame member 40 to move laterally with respect to frame member 36 via the leaf springs 42 and 44. A bar 46 extends from the frame member 40 and has a free end positioned adjacent the frame member 36. A displacement transducer 50 is mounted on the frame member 36 and detects movement of the bar 46 and hence, frame member 40 (see FIG. 6). This of course allows movement of the deflection chute 30 to be detected.

Displacement transducer 50 includes a pneumatic dashpot 50a mounted on a bracket 50b secured to the frame member 36 by fasteners 50c. A rod 50d extends through the distal end of bar 46 and is threaded to the dashpot 50a at one end. The opposite end of the rod 50d extends to a linear voltage differential transformer (LVDT) 50e. The LVDT 50e is mounted on a flange 50f which is secured to the frame member 36 by fasteners 50g.

The displacement transducer 50 generates output signals proportional to the lateral displacement of the bar 46 which are conveyed to the controller 15. Controller 15 includes signal conditioning circuity 60 (see FIG. 7) for conditioning the output signals of the displacement transducer before the output signals are applied to a motor driver 62. Motor driver 62 in turn, drives the gate control motor 34 as required to adjust the position of the inlet gate 22 and control the rate of flow of material through the flow control device 8. A power supply 64 is mounted on internal wall 10c to supply power to the various components of the flow control device 8.

The operation of the flow control device 8 will now be described. When it is desired to control the flow of granular material or the like, the material is fed to the flow control device 8 by way of inlet 20a of the chute 20. The inlet gate 22 is positioned to control the ingress of material to the flowmeter 14 so that the rate of flow of material through the flowmeter is at or near to the desired rate. The rate of flow of material through the flowmeter is detected as follows.

As material exits the chute 20 and passes by the inlet gate 22, the material is collected by the deflection chute 30 into a coherent stream and redirected so that the material leaves the deflection chute 30 and exits the housing 10 via outlet 16 in a consistent direction slightly below the horizontal. The force applied to the deflection chute 30 by the material as it is continuously redirected can be expressed by:

$$F_x = (\delta m/\delta t) v \cos\theta. \quad (1)$$

where:

$F_x$ is horizontal force on the deflection chute;

$\delta m/\delta t$ is the flow rate of material;

V is the speed of the material leaving the deflection chute; and

θ is the angle below horizontal at which the material leaves the deflection chute.

The force applied to the deflection chute 30 by the flow of material is translated to the parallelogram suspension 34 by way of the arm 32. This results in lateral movement of frame member 40 and flexing of the leaf springs 42 and 44 which in turn causes the bar 46 to move laterally. The lateral displacement of the bar 46 is detected by the displacement transducer 50 which in turn generates output signals proportional to the forces applied to the deflection chute 30 by the flow of material. The output signals of the displacement transducer 50 are compared with a selectable desired rate of flow value, representing the desired rate of flow of material through the flow control device 8, by the signal conditioning circuitry 60. The signal conditioning circuitry 60 in turn generates output signals dependent on the result of the comparison which are used by the motor driver 62 to operate the gate control motor 34 so that the position of the inlet gate 22 is adjusted accordingly. Thus, if the signal conditioning circuitry 60 detects that the output of the displacement transducer 50 represents a rate of flow of material through the flowmeter 14 below the desired rate, the position of the inlet gate 22 is adjusted to open further the inlet 12. Conversely if the signal conditioning circuitry 60 detects that the output of the displacement transducer 50 represents a rate of flow through the flowmeter 14 greater than the desired rate of flow, the position of the inlet gate 22 is adjusted to restrict the inlet 12.

The present invention provides advantages in that the curved deflection chute arrangement results in larger and steadier forces being applied to the parallelogram suspension 34 by way of the deflection chute 30 and arm 32 which are less dependant on material properties than prior art designs. This of course allows for greater accuracy when controlling the rate of flow of material. The increased accuracy of the measurement of the rate of flow of material by the present invention is achieved primarily for two reasons. Firstly, by collecting the material into a coherent stream as it travels through the flowmeter, a more consistent force is imparted on the flowmeter by the material. Secondly, by redirecting the coherent stream as it travels through the flowmeter, an increased force is imparted on the flowmeter increasing its sensitivity.

In addition, the design of the inlet chute 20 and specifically the trapezoidal outlet 20c, results in an outlet which reduces in width as the inlet gate 22 is opened. This configuration compensates for the fact that the edge friction of the outlet becomes proportionally smaller as the gate is opened. By tapering the width of the outlet, this non-linearity can be compensated for resulting in a chute which provides for a linear increase in the flow of material through it as the inlet gate 22 is opened.

Furthermore, since the plane of the parallelogram suspension is horizontal, the restoring force of the parallelogram suspension is determined solely by the properties of the leaf springs. Also, the use of rigid leaf springs to confine the flexing of the parallelogram suspension to four lines adjacent the corners of the parallelogram suspension, allows the parallelogram suspension to support the heavy deflection chute while still deflecting in response to small horizontal forces applied to it by the deflection chute 30 via of the arm 32.

Although the flow control device has been described as having a flowmeter with a deflection chute which redirects the stream of material from a vertical path to a generally horizontal path, it should be apparent to those of skill in the art that the exit direction of the stream of material can be varied. It has however been found that a generally horizontal exit path results in larger forces being applied to the flowmeter by the material and therefore increases the sensitivity of the flowmeter. Also, although the flow control device has been described as having a deflection chute which both collects the material into a coherent stream and redirects it, those of skill in the art will appreciate that a chute which only collects the material into a coherent stream as it goes through the flowmeter will result in more accurate measurements as compared to prior art flowmeters.

Although a single embodiment of a flow control device and a flowmeter have been described, those of skill in the art will appreciate that variations and modifications may be made to the present invention without departing from the scope thereof as defined by the appended claims.

We claim:

1. A flow control device to control the rate of flow of granular material therethrough comprising:

a valved inlet controlling the ingress of granular material into said flow control device;

a flowmeter receiving said granular material from said valved inlet, said granular material exiting said valved inlet along a generally steep path, said flowmeter including a guide in the form of a curved chute having a first end adjacent said valved inlet receiving granular material exiting therefrom and a second substantially horizontal end discharging said granular material said curved chute garnering said granular material into a generally coherent stream and redirecting the flow of said granular material from said generally steep path to a substantially horizontal path, said flowmeter generating output signals proportional to the rate of flow of said granular material in response to forces applied to said curved chute by said flow of granular material; and a controller comparing the output signals of said flowmeter with a setting representing a desired rate of flow and controlling said valved inlet when said output signals differ from said setting to adjust the rate of flow of granular material through said flow control device to said desired rate of flow.

2. A flow control device as defined in claim 1 wherein said second end is adjacent an outlet of said flow control device.

3. A flow control device as defined in claim 2 wherein said flow of granular material is discharged from said curved chute following a path slightly below horizontal.

4. A flow control device as defined in claim 2 wherein said flowmeter further includes a suspension supporting said curved chute, said suspension allowing said curved chute to displace as a result of forces applied thereto as said flow of granular material is redirected; and a sensor detecting displacement of said curved chute and generating output signals proportional to said rate of flow of granular material.

5. A flow control device as defined in claim 4 wherein said suspension includes an arm supporting said curved chute and a parallelogram suspension to which said arm is attached, displacement of said curved chute being translated to said parallelogram suspension, said sensor detecting displacement of said parallelogram suspension.

6. A flow control device as defined in claim 5 wherein said parallelogram suspension includes a stationary frame member coupled to a moveable frame member to which said arm is attached, by way of a pair of leaf springs.

7. A flow control device as defined in claim 6 wherein said sensor includes a displacement transducer mounted on said stationary frame member and communicating with a rod on said moveable frame member to detect displacement of said parallelogram suspension.

8. A flow control device as defined in claim 1 wherein said valved inlet includes a second chute having an opening to receive the ingress of said granular material; an outlet to permit the egress of said granular material; and a gate movable in response to said controller to adjust the egress of granular material via said outlet, said outlet being configured to compensate for non-linearities and maintain generally a linear increase in the egress of granular material via said outlet when the gate is moved to increase the rate of flow of said granular material to said flowmeter.

9. A flow control device as defined in claim 8 wherein the outlet of said second chute narrows in width as said gate is moved to increase the rate of flow of granular material to said flowmeter and increases in width as said gate is moved to decrease the rate of flow of granular material to said flowmeter.

10. A flow control device as defined in claim 9 wherein the outlet of said second chute is generally trapezoidal when viewed in top plan.

11. A flow control device to control the rate of flow of granular material therethrough comprising:

a valved inlet controlling the ingress of granular material into said flow control device;

a flowmeter receiving said granular material via said valved inlet, said granular material exiting said valved inlet along a generally steep path, said flowmeter including a curved chute having a first end adjacent said valved inlet receiving granular material exiting therefrom and a second substantially horizontal end discharging said granular material, said curved chute garnering said granular material into a generally coherent stream and redirecting the flow of granular material from said generally steep path to a substantially horizontal path; a suspension supporting said curved chute to allow said curved chute to displace as a result of forces applied thereto by the flow of granular material; and a sensor detecting displacement of said curved chute and generating output signals proportional to said rate of flow of said granular material; and a controller comparing the output signals of said sensor with a setting representing a desired rate of flow and controlling said valved inlet when said output signals differ from said setting to adjust the rate of flow of granular material through said flow control device to said desired rate of flow.

12. A flow control device as defined in claim 11 wherein said suspension includes an arm supporting said curved chute and a parallelogram suspension to which said arm is attached, displacement of said curved chute being translated to said parallelogram suspension, said sensor detecting displacement of said parallelogram suspension.

13. A flow control device as defined in claim 12 wherein said parallelogram suspension includes a stationary frame member coupled to a moveable frame member to which said arm is attached, by way of a pair of leaf springs.

14. A flow control device as defined in claim 13 wherein said sensor includes a displacement transducer mounted on said stationary frame member and communicating with a rod on said moveable frame member to detect displacement of said parallelogram suspension.

15. A flow control device as defined in claim 14 wherein said displacement transducer includes a dashpot moveable in response to movement of said rod and a linear voltage differential transformer in communication with said dashpot to generate an output signal having a magnitude proportional to the rate of flow of said granular material.

\* \* \* \* \*